Sept. 8, 1959 G. S. MARSHALL 2,902,839
APPARATUS FOR PRODUCING A THERMAL ABSORPTION BANK OF WATER
Filed Oct. 12, 1956 3 Sheets-Sheet 3
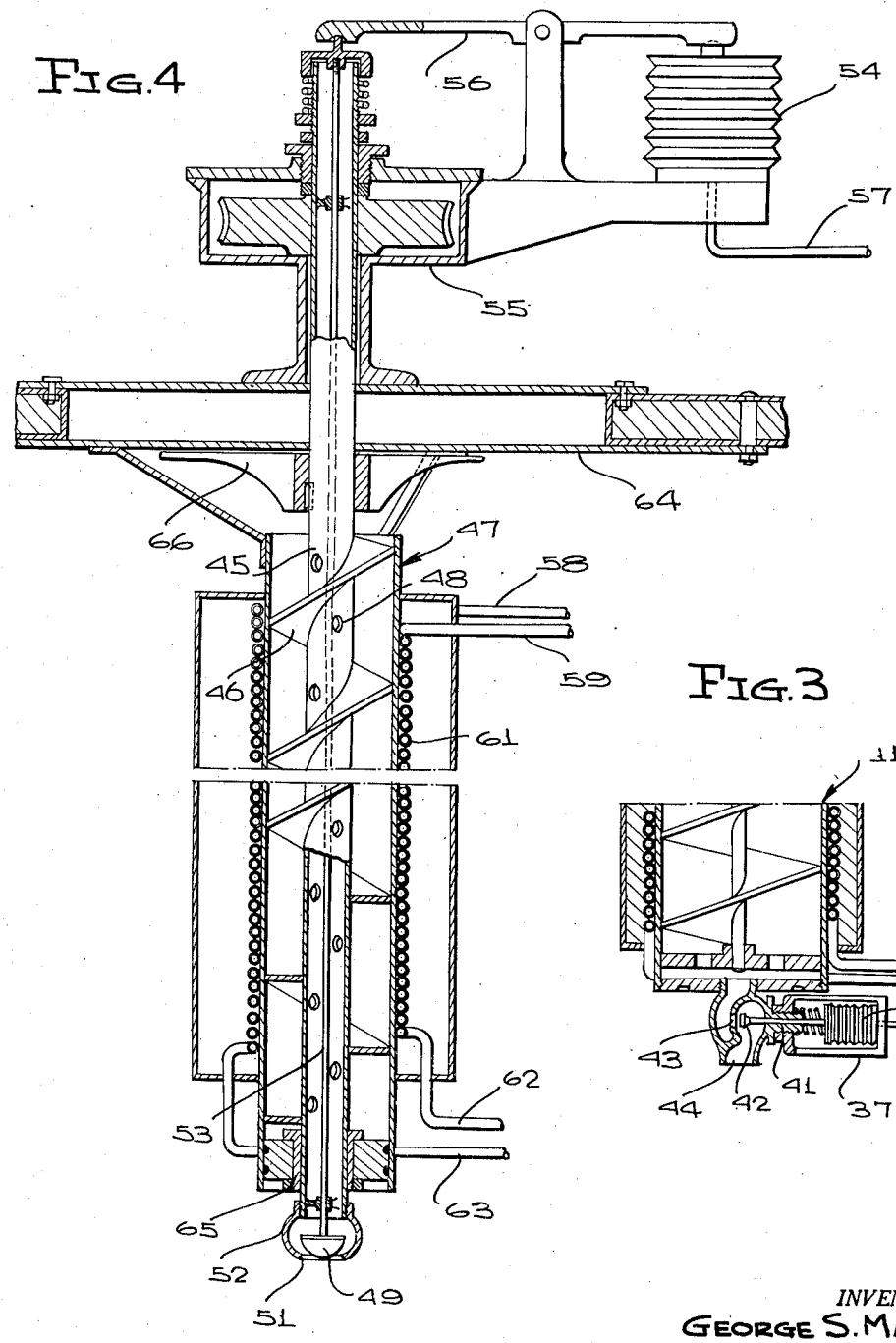
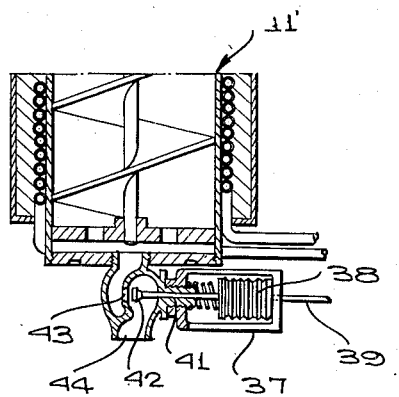
INVENTOR.
GEORGE S. MARSHALL
BY
McMorrow, Berman + Davidson
ATTORNEYS

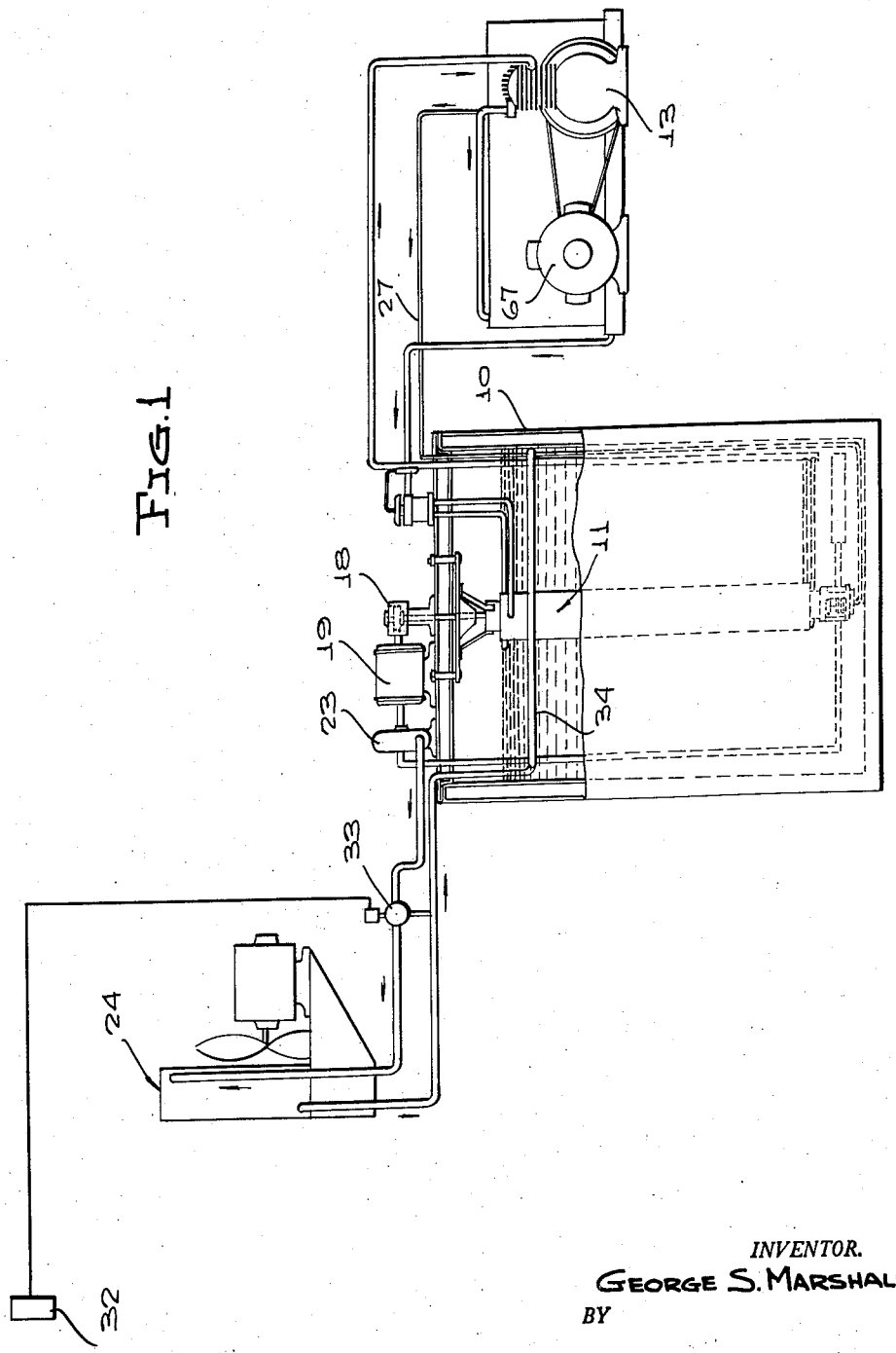

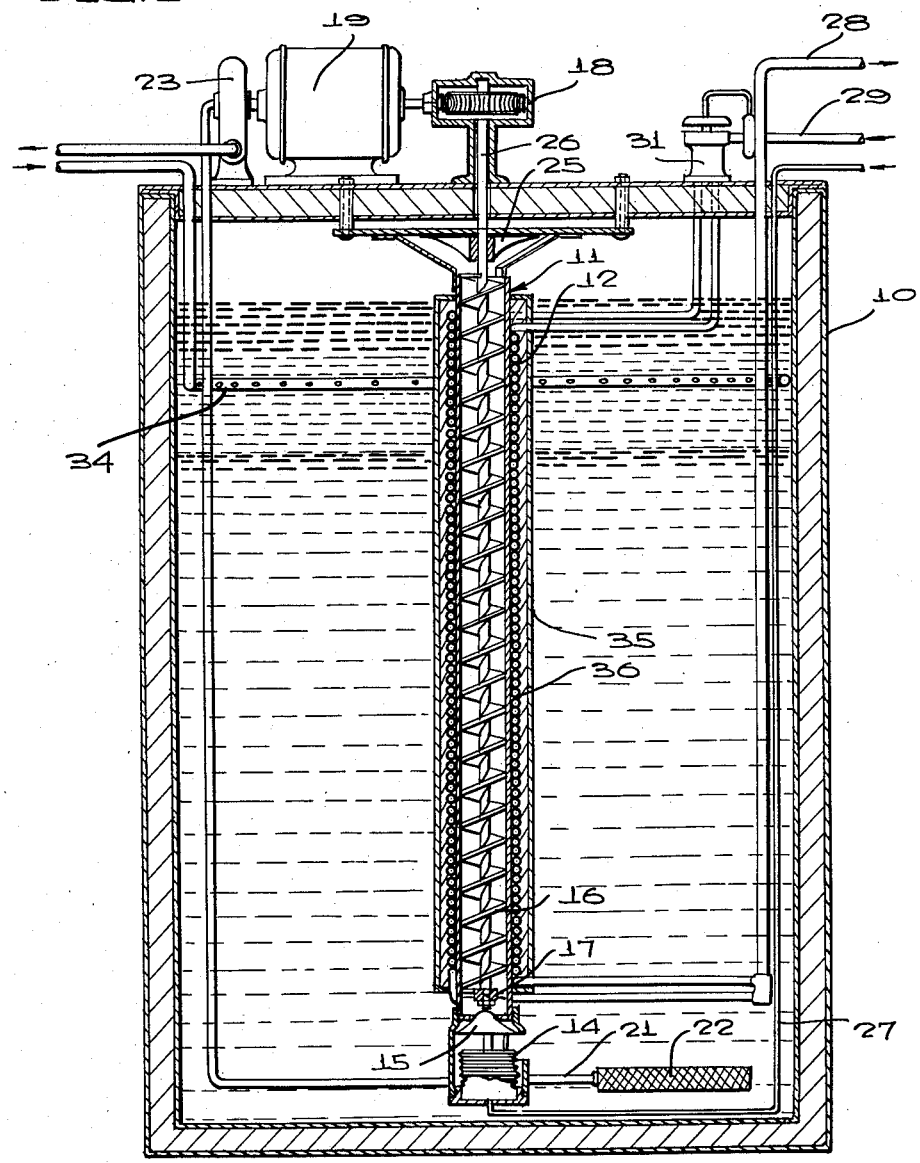

United States Patent Office 2,902,839
Patented Sept. 8, 1959

2,902,839

APPARATUS FOR PRODUCING A THERMAL ABSORPTION BANK OF WATER

George S. Marshall, Pickstown, S. Dak.

Application October 12, 1956, Serial No. 615,704

4 Claims. (Cl. 62—354)

This invention relates to apparatus for producing a thermal absorption bank of water.

An object of the present invention is to provide an apparatus for producing a thermal absorption bank of water containing ice slush suspended therein.

Another object of the present invention is to provide an apparatus for producing a thermal absorption bank containing ice slush suspended therein in which ice is formed under controlled condition and the ice as it is being formed is broken up into ice particles and admixed with a body of water.

A further object of the present invention is to provide an apparatus for producing a thermal absorption bank of water containing ice slush suspended therein which makes the formation of such bank of a magnitude such as to provide a storage supply of water containing ice slush.

A still further object of the present invention is to provide an apparatus for producing a thermal absorption bank of water containing ice slush which is positive in operation, highly efficient in action, and commercially feasible.

These and other objects and advantages of the present invention will be fully apparent from the following description when taken in connection with the annexed drawings, in which:

Figure 1 is an elevational view of the apparatus of the present invention, showing schematically an air conditioning unit and a compressor;

Figure 2 is a sectional view, on an enlarged scale, of the apparatus of Figure 1;

Figure 3 is a fragmentary sectional view of a modified form of the valve used in Figures 1 and 2; and Figure 4 is a sectional view, partially broken away, showing another modified form of the valve and a modified form of the drive shaft.

Referring to the drawings, the apparatus of the present invention for carrying out the method for producing a thermal absorption bank of water containing ice slush suspended therein comprises a double-walled tank 10 and a vertically disposed double-walled tube 11, constituting a tunnel, is positioned centrally of the tank and has a refrigerating coil 12, constituting a cooling means, surrounding and extending the entire length of the double-walled tube 11 between the walls of the tube 11. The coil 12 is connected, as seen in Figure 1, to a refrigerating compressor of conventional make and operation, the compressor being indicated generally by the reference numeral 13.

Valve means is provided operatively connected to the lower end of the tube 11 for controlling the admission of water from the receptacle or tank 10 into the tube 11. This valve means, in a first embodiment shown in Figures 1 and 2, consists in a bellows 14 connected in communication with the high side of the compressor 13 and having a valve 15 mounted thereon and operable to close the passage into the lower end of the tube 11.

A rotatable conveyor means is positioned within the tube 11 and extends the entire length of the tube 11 for progressively feeding the ice particles formed on the inner wall of the tube 11 toward and out of and exteriorly of the upper end of the tube 11 and discharging the ice particles to the body of water in the tank 10. The conveyor means consists in a vertically disposed screw 16 having its lower end mounted in a bearing block 17 and its upper end extending through the upper end of the tank 10 and connected by means of a reduction gear 18 to a driving motor 19.

A conduit 21 is positioned within the tank 10 and spaced from the lower end of the tube 11 and has one end adjacent to the bottom of the tank 10 in communication with the interior of the tank 10 for withdrawing the portion of the body of water remote from the upper end of the tube 11. A screen 22, constituting a separating means, covers the one end of the conduit 21 adjacent to the bottom of the tank 10 for separating the ice particles from the water as it enters the conduit 21. The other end of the conduit 21 leads to a water pump 23 driven by the motor 19 for pumping the cooled water to an air conditioning unit 24 or other refrigerant using device.

Distribution means is provided at the upper end of the tube 11 for depositing the discharged ice particles over the area of water body exteriorly of the tube 11 and consists in a plurality of vanes 25 mounted on the shaft 26 of the screw 16. The vanes 25 rotate with the shaft 26 and serve to spread the ice particles received from the upper end of the tube 11 and to spread them in the upper end of the tank 10 over the body of water therein. A conduit 27 connects the bellows 14 with the high pressure side of the compressor 13. When pressure in the condensing system reaches a predetermined pressure based on the design capacity of the system, the bellows 14 will expand and stop the flow of water into the tube 11. Conduits 28 and 29 connect the condensing system to the coil 12 and a thermally responsive valve assembly 31 controls the flow of the refrigerant in a conventional manner.

A conventionally arranged thermostat 32 and control valve 33 controls the flow of the refrigerated or chilled water from the conduit 21 to the air conditioning unit 24 and thence back to the tank to a distributing conduit 34 positioned adjacent to the upper end of the tube 11 and provided with a plurality of openings, as seen in Figure 2, for distributing the warmed water back in the area of the suspension of ice particles in the upper end of the tank 10. Insulation of conventional design fills the space between the outer wall 35 and the inner wall 36 of the tube 11.

In Figure 3 is shown a modification of the valve which admits water into the lower end of the tube constituting the tunnel. In this form, a casing 37 supports a horizontally disposed expandable bellows 38 which is connected by means of a conduit 39 to the high side of the compressor or condensing system. A valve stem 41 is operatively connected to the free end of the bellows 38 and carries a valve head 42 seatable upon a valve seat 43 in the passage 44 leading to the lower end of the tube 11'. The operation of this valve assembly is identical with that of the valve 15 carried by the bellows 14 in Figures 1 and 2.

In Figure 4, the shaft 45 which supports the screw 46 within the tube 47 is hollow and is provided with openings 48 for the passage of water from the interior of the shaft 45 to the space within the tube 47. A valve 49 is seatable on the valve seat 51 provided in the casing 52 which is attached to and carried by the lower end of the shaft 45 and rotatable therewith. A rod 53 extends through and is supported in the hollow shaft 45 for vertical limited movement and carries on its lower end the valve 49. A bellows 54 is mounted on the reduction gear casing 55 and controls, by means of a rocker arm assembly 56, the vertical movement of the rod 53 to open and close the valve 49. A conduit 57 connects the bellows 54 in communication with the high pressure side of the condensing system in the same manner as heretofore explained with reference to the form of the invention shown in Figures 1 and 2, and in Figure 3. Conduits 58 and 59 connect the coil 61 within the tube 47 to the condensing system for admission thereto of the refrigerant and other conduits 62 and 63 return the refrigerant to the compressor in the conventional manner.

The form of the invention shown in Figure 4 permits the easy removal of the screw 46 from within the tank, the upper wall of the tank being shown and indicated by the reference numeral 64. A suitable bearing block 65 in the lower end of the tube 47 supports the shaft 45 for rotational movement, and vanes 66 mounted on the upper end portion of the shaft 45 constitute the distributing means for distributing the ice particles within the top layer of the water contained within the tank.

In operation of the apparatus of the present invention for producing a thermal absorption bank of water in the above described apparatus, a body of water is placed in the tank 10 and in the body of water is added an agent which possesses the property of destroying the surface tension of water and also, the property of modifying not only the ice crystal formation of water but also restrains and resists the cohesion of the formed ice crystals. Such an agent found to be satisfactory is an aliphatic polyoxyethylene ether, and marketed by the Monsanto Chemical Company under the name of "Sterox A. J."

The water is caused to flow from the lower end to the upper end of the tube 11 which constitutes a tunnel, while the tube 11 is cooled by the coil 12 throughout to a temperature below and adjacent the freezing point of water to form a film of ice on the inner wall of the tube 11. The next step is separating by the screw 16 this ice film as it is formed from the inner wall of the tube 11 in the form of ice particles and progressively feeding the separated ice particles from the lower end to the upper end of the tube 11 and into the body of water exteriorly of the tube 11 and distributing the ice crystals outwardly from the tube 11 to thereby form a body of water having ice slush suspended therein.

The chilled water is drawn out through the conduit 21 and is used in the air conditioning unit 24 in the conventional manner.

It will be seen, therefore, that the method and apparatus of the present invention provides a thermal absorption bank of water which permits a storage of thermal energy during periods of off-peak consumption of electric power by the motors 19 and 67 and therefore a plurality of air conditioning units 24 or other refrigerating apparatus may be economically operated at a lower cost per unit than heretofore possible.

What is claimed is:

1. Apparatus for producing a thermal absorption bank of water having ice slush suspended therein comprising an upstanding closed receptacle adapted to contain a body of water, an upstanding closed tunnel positioned within said receptacle so that the lower end is adjacent to and spaced from the bottom of said receptacle and the upper end is adjacent to and spaced below the top of said receptacle, cooling means surrounding and extending the entire length of the exterior of said tunnel, valve means operatively connected to the lower end of said tunnel for controlling the admission of the water from said receptacle into said tunnel, rotatable conveying means positioned within and extending the entire length of said tunnel for progressively feeding the ice particles toward and out of and exteriorly of the upper end of said tunnel and discharging same onto the body of water in said receptacle, and a conduit positioned within said receptacle and spaced from said tunnel and having one end adjacent to the bottom of said receptacle for withdrawing the portion of water from the body of water remote from the upper end of said tunnel.

2. Apparatus for producing a thermal absorption bank of water having ice slush suspended therein comprising an upstanding closed receptacle adapted to contain a body of water, an upstanding closed tunnel positioned within said receptacle so that the lower end is adjacent to and spaced from the bottom of said receptacle and the upper end is adjacent to and spaced below the top of said receptacle, cooling means embodying a plurality of coils arranged in superimposed abutting relation surrounding and extending the entire length of the exterior of said tunnel, valve means operatively connected to the lower end of said tunnel for controlling the admission of water from said receptacle into said tunnel, rotatable conveying means embodying a rotatable screw positioned within and extending the entire length of said tunnel for progressively feeding the ice particles toward and out of and exteriorly of the upper end of said tunnel and discharging same onto the body of water in said receptacle, and a conduit positioned within said receptacle and spaced from said tunnel and having one end adjacent to the bottom of said receptacle and in communication with the interior of said receptacle for withdrawing the portion of water from the body of water remote from the upper end of said tunnel.

3. Apparatus for producing a thermal absorption bank of water having ice slush suspended therein comprising an upstanding closed receptacle adapted to contain a body of water, an upstanding closed tunnel positioned within said receptacle so that the lower end is adjacent to and spaced from the bottom of said receptacle and the upper end is adjacent to and spaced from the top of said receptacle, cooling means surrounding and extending the entire length of the exterior of said tunnel, valve means operatively connected to the lower end of said tunnel for controlling the admission of water from said receptacle into said tunnel, rotatable conveying means positioned within and extending the entire length of said tunnel for progressively feeding the ice particles toward and out of and exteriorly of the upper end of said tunnel and discharging same onto the body of water in said receptacle, a conduit positioned within said receptacle and spaced from said tunnel and having one end adjacent to the bottom of said receptacle and in communication with the interior of said receptacle for withdrawing the portion of water from the body of water remote from the upper end of said tunnel, and separating means on said one end of said conduit for separating the ice particles from the portion of the body of water before entry into said conduit.

4. Apparatus for producing a thermal absorption bank of water having ice slush suspended therein comprising an upstanding closed receptacle adapted to contain a body of water, an upstanding closed tunnel positioned within said receptacle so that the lower end is adjacent to and spaced from the bottom of said receptacle and the upper end is adjacent to and spaced below the top of said receptacle, cooling means surrounding and extending the entire length of the exterior of said tunnel, valve means operatively connected to the lower end of said tunnel for controlling the admission of water from said receptacle into said tunnel, rotatable conveying means positioned within and extending the entire length of said tunnel for progressively feeding the ice particles toward and out of and exteriorly of the upper end of said tunnel and discharging same onto the body of water in said receptacle, a conduit positioned within said receptacle and spaced from said tunnel and having one end adjacent to the bottom of said receptacle and in communication with the interior of said receptacle for withdrawing the portion of water from the body of water remote from the upper end of said tunnel, and distributing means exteriorly of and adjacent the upper end of said tunnel for depositing the discharged ice particles over the area of the water body exteriorly of said tunnel.

References Cited in the file of this patent

UNITED STATES PATENTS

| | | |
|---|---|---|
| 530,527 | Holden | Dec. 11, 1894 |
| 1,415,325 | Ellis | May 9, 1922 |
| 1,891,714 | Jordan et al. | Dec. 20, 1932 |
| 2,071,465 | Huber | Feb. 23, 1937 |
| 2,149,000 | Udell | Feb. 28, 1939 |
| 2,221,212 | Wussow | Nov. 12, 1940 |
| 2,299,414 | Spiegl | Oct. 20, 1942 |
| 2,419,881 | Borgerd | Apr. 29, 1947 |
| 2,571,506 | Watt | Oct. 16, 1951 |
| 2,597,515 | Nitsch | May 20, 1952 |
| 2,659,761 | Frevel | Nov. 17, 1953 |
| 2,693,680 | Lee | Nov. 9, 1954 |
| 2,753,694 | Trow | July 10, 1956 |